United States Patent
Niitaka et al.

(10) Patent No.: US 9,884,983 B2
(45) Date of Patent: Feb. 6, 2018

(54) HEAT STORAGE MATERIAL

(71) Applicant: RIKEN, Wako-shi, Saitama (JP)

(72) Inventors: Seiji Niitaka, Wako (JP); Hidenori Takagi, Tokyo (JP); Kimitoshi Kono, Tokyo (JP)

(73) Assignee: RIKEN, Wako-shi (JP)

( * ) Notice: Subject to any disclaimer, the term of this patent is extended or adjusted under 35 U.S.C. 154(b) by 0 days.

(21) Appl. No.: 14/785,492

(22) PCT Filed: Apr. 15, 2014

(86) PCT No.: PCT/JP2014/060695
§ 371 (c)(1),
(2) Date: Oct. 19, 2015

(87) PCT Pub. No.: WO2014/171444
PCT Pub. Date: Oct. 23, 2014

(65) Prior Publication Data
US 2016/0075926 A1    Mar. 17, 2016

(30) Foreign Application Priority Data

Apr. 17, 2013 (JP) .................. 2013-086504

(51) Int. Cl.
*C09K 5/02* (2006.01)
*C04B 35/12* (2006.01)
*C04B 35/495* (2006.01)

(52) U.S. Cl.
CPC ............... *C09K 5/02* (2013.01); *C04B 35/12* (2013.01); *C04B 35/495* (2013.01)

(58) Field of Classification Search
CPC ............ C04B 35/12; C04B 35/495; C09K 5/02
See application file for complete search history.

(56) References Cited

U.S. PATENT DOCUMENTS

2001/0027856 A1   10/2001   Okamoto et al.

FOREIGN PATENT DOCUMENTS

| CN | 1837061 A | 9/2006 |
|---|---|---|
| JP | S63-207799 A | 8/1988 |
| JP | H11-217562 A | 8/1999 |
| JP | 2010-163510 A | 7/2010 |

OTHER PUBLICATIONS

Kachi, Sukeji et al., "Metal-Insulator Transition in VnO2n-1," Journal of Solid State Chemistry, vol. 6, pp. 258-270, (1973).
Goodenough, J. B. et al., "Structures and a Two-Band Model for the System V1-xCrxO2," Physical Review B, vol. 8, No. 4, Aug. 15, 1973, pp. 1323-1331.
Fittipaldi, Fabio, "Phase Change Heat Storage," Energy Storage and Transportation: Prospects for New Technologies, pp. 169-182, (1981).
Jun. 10, 2014 Search Report issued in International Patent Application No. PCT/JP2014/060695.

*Primary Examiner* — Karl Group
(74) *Attorney, Agent, or Firm* — Oliff PLC

(57) ABSTRACT

The heat storage material of the present invention is a heat storage material comprising a substance that induces an electronic phase transition, wherein the electronic phase transition is a phase transition of multiple degrees (associated) with freedom including a spin degree of freedom and an orbital degree of freedom, which are internal degrees of freedom of electrons, and the substance is $V_{(1-x)}Cr_xO_2$ ($0 < X \leq 0.23$).

8 Claims, 4 Drawing Sheets

[Fig. 1]
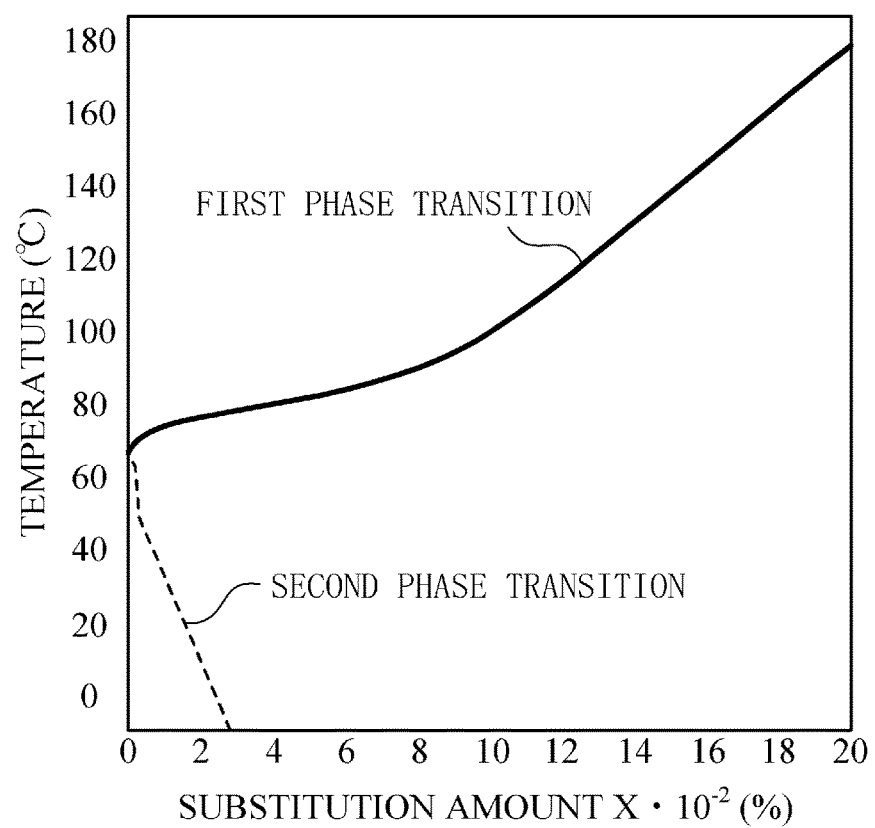

[Fig. 2]
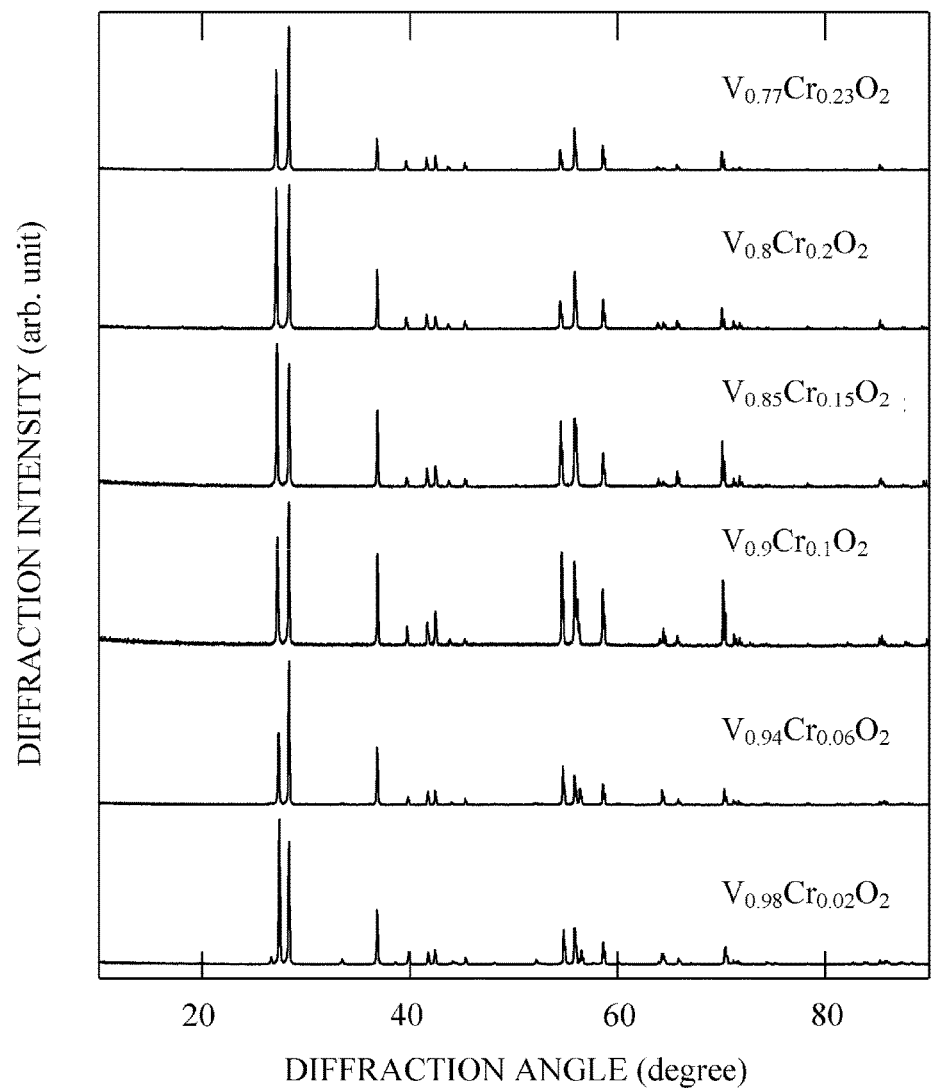

[Fig. 3]
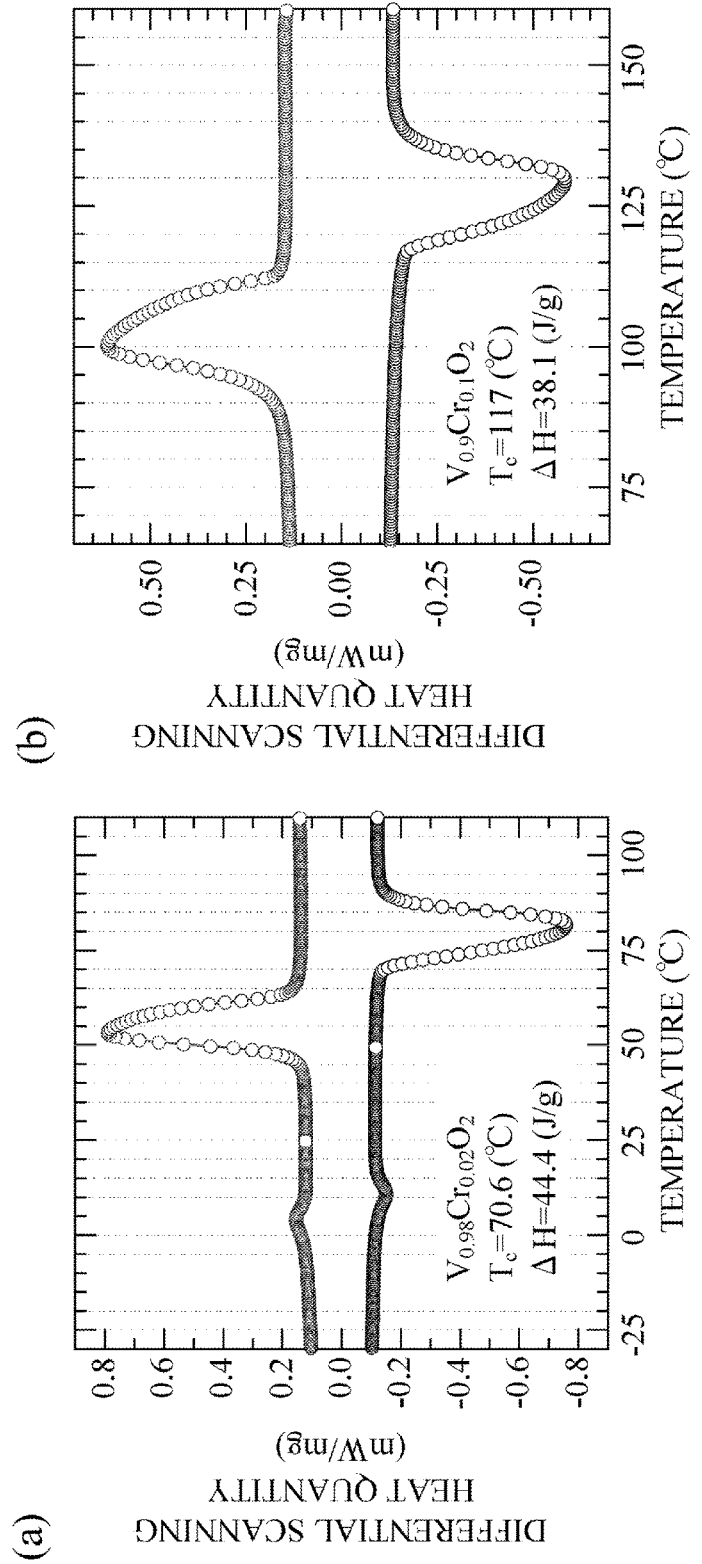

[Fig. 4]
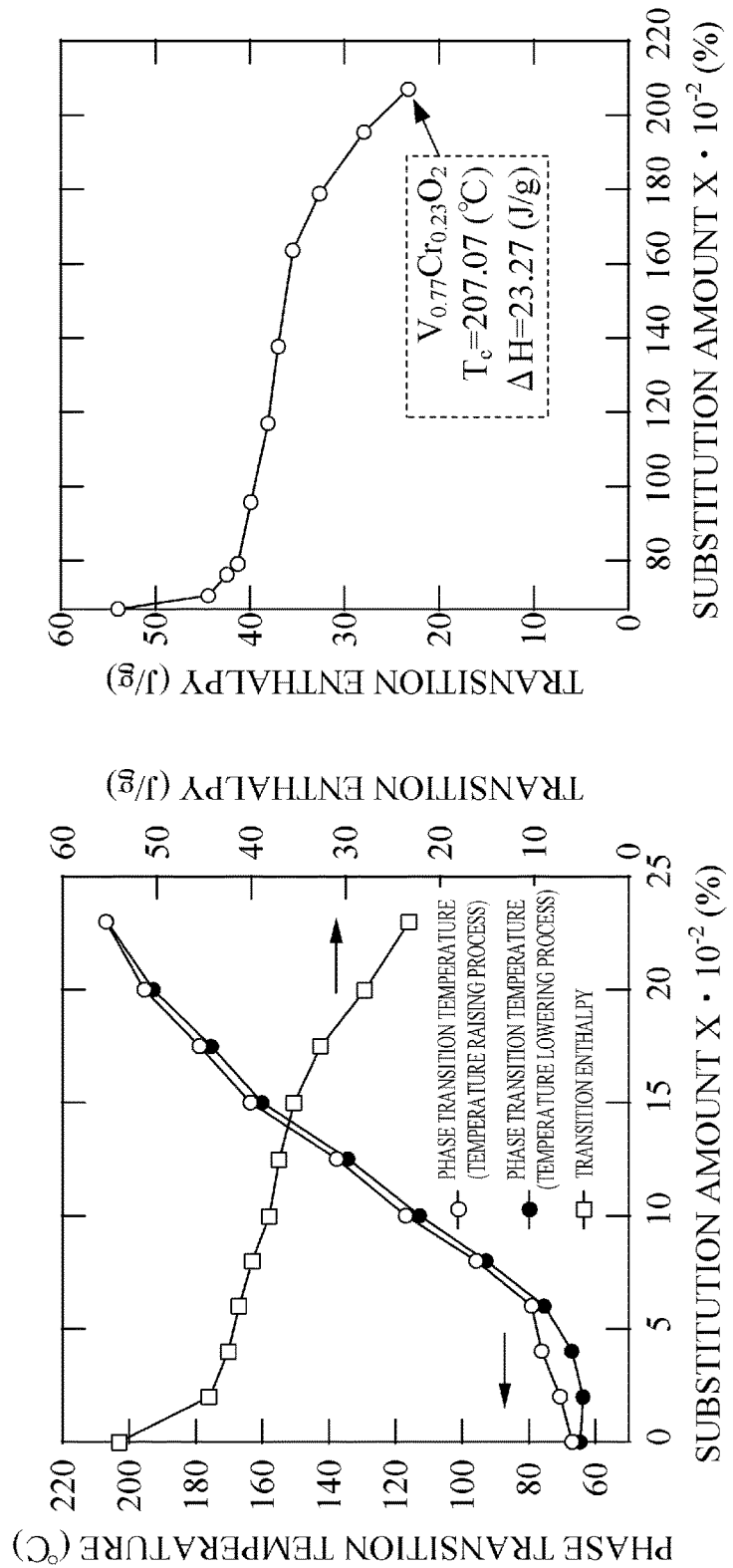

HEAT STORAGE MATERIAL

TECHNICAL FIELD

The present invention relates to a heat storage material.

BACKGROUND ART

The term "heat storage" denotes storing of heat in a substance, and substances that are used for heat storage are referred to as heat storage materials. By heat storage, the temperature of a heat storage material itself, the temperature of the interior of the space in which the heat storage material is disposed, or the like can be maintained substantially constant. For instance, by using heat storage (technologies), solar energy or waste heat can be stored in a substance as heat, and this heat can be used for heating. Furthermore, ice can be generated during the nighttime when power consumption is low, and the produced ice (and heat of fusion of ice) can be used for cooling during the daytime. Thus, through storage of heat, various kinds of energy can be converted into heat and stored, and then re-used. Heat storage technologies therefore play a part in energy conservation being currently advocated. Accordingly, heat storage technologies urgently require further developments.

Heat storage mechanisms can be divided into sensible heat storage and latent heat storage. Sensible heat storage exploits the large specific heat of certain substances. For instance, hot water bottles rely on the large specific heat of water. Latent heat storage exploits the enthalpy of phase transitions. For instance, cooling of drinks using ice water relies on the heat of fusion (enthalpy of fusion) of ice.

In latent heat storage, the enthalpy of a phase transition in a substance is resorted to; as a result, the temperature of the substance can be kept substantially constant, and heat can be added to the substance, and taken from the substance, at a substantially constant temperature of the substance (in sensible heat storage, although temperature changes of the substance with respect to the outside world temperature are small, the temperature of the substance does change gradually nevertheless). Accordingly, technical developments are currently focused on latent heat storage.

Materials for latent heat storage having been developed so far include inorganic salt hydrates, organic materials, molten salts and the like. All the foregoing are heat storage materials that rely on the large enthalpy of solid-liquid phase transitions.

Although large enthalpy changes due to solid-liquid phase transitions are certainly an important factor in heat storage materials, other characteristics, aside from large enthalpy changes, are likewise required from heat storage materials. For instance, it is important that the temperature in the surface of the heat storage material be kept substantially constant over long periods of time; accordingly, heat storage materials are required to exhibit high thermal conductivity. In substances of low thermal conductivity, a large temperature difference arises between the temperature of the surface and the temperature of the interior, and thus the temperature of the surface cannot be kept substantially constant (paraffin, which is an organic material, has low thermal conductivity). When relying on solid-liquid phase transitions in substances that exhibit large volume changes (expansion/contraction) elicited by phase transitions liquid leakage maybe caused. Accordingly, changes in volume derived from phase transitions have to be accordingly small (i.e. in cases where the volume changes are large, a container that withstands the volume changes must be selected as the container of the heat storage material). Further, the heat storage effect is impaired when phase separation or decomposition occurs during phase transitions (in the worst case, the material can no longer be used as a heat storage material). Accordingly, such material s are required not to undergo phase separation or decomposition during phase transitions.

CITATION LIST

Non-Patent Literature

Non-Patent Literature 1: Journal of Solid State Chemistry, Vol. 6, pp. 258-270, 1973

Non-Patent Literature 2: Physical Review B, Vol. 8, pp. 1323-1331, 1973

SUMMARY OF INVENTION

Technical Problem

Therefore, the present invention provide s a novel type of heat storage material that meets necessary requirements for heat storage materials.

Solution to Problem

The heat storage material of the present invention is a heat storage material comprising a substance that induces an electronic phase transition, wherein the electronic phase transition is a phase transition (associated) with multiple degrees of freedom including a spin degree of freedom and an orbital degree of freedom, which are internal degrees of freedom of electrons, and the substance is $V_{(1-x)}Cr_xO_2$ ($0<X\leq0.23$).

In the present invention, $V_{(1-x)}Cr_xO_2$ ($0<X\leq0.23$), which is a substance that induces an electronic phase transition, is used as a heat storage material. In the present invention there is utilized a phase transition with multiple degrees of freedom including a spin degree of freedom and an orbital degree of freedom, which are internal degrees of freedom of electrons. Such a phase transition has the following characteristics.

The phase transition occurs in a solid-phase. Accordingly, there is no concern about leakage of the heat storage material (liquid) out of a container.

There is no concern of phase separation or decomposition during phase transition, unlike in solid-liquid phase transitions of inorganic salt hydrates or the like.

The change in volume during the phase transition is smaller than in solid-liquid phase transitions.

Further, the substance exhibiting such phase transition has high thermal conductivity. The enthalpy of the above phase transition in $V_{(1-x)}Cr_xO_2$ ($0<X\leq0.23$) is comparable to the enthalpy of the solid-liquid phase transition of $H_2O$. Accordingly, a novel type of heat storage material, that meets necessary requirements for a heat storage material, can be provided.

It is preferable that the value of X is selected in accordance with an intended electronic phase transition temperature. In latent heat storage, heat is stored at (in the vicinity of) the phase transition temperature. The phase transition temperature in the above substance can be changed by adjusting the value of X. Accordingly, a substance that undergoes a phase transition at the target temperature can be easily utilized by selecting thus the value of X.

The substance is synthesized by mixing $V_2O_3$ powder, $V_2O_5$ powder and $Cr_2O_3$ powder in such a manner that a molar ratio of vanadium, chromium and oxygen is a predetermined molar ratio, and by heating a mixture obtained through mixing, and it is preferable that the substance is synthesized through vacuum sealing (for instance, vacuum sealing under vacuum of $2 \times 10^{-6}$ torr) and heating of the mixture. By $V_{(1-x)}Cr_xO_2$ being synthesized with this synthesis method, $V_{(1-x)}Cr_xO_2$ up to X=0.23 can be synthesized. The method allows synthesizing $V_{(1-x)}Cr_xO_2$ that exhibits a higher phase transition temperature than that of $V_{(1-x)}Cr_xO_2$ synthesized in accordance with the other synthesis method.

Advantageous Effects of Invention

The present invention succeeds in providing a novel type of heat storage material that meets necessary requirements for a heat storage material.

BRIEF DESCRIPTION OF DRAWINGS

FIG. 1 is a graph illustrating a relationship between substitution amount and phase transition temperature in a case where part of V in $VO_2$ is substituted by chromium (Cr);

FIG. 2 is a graph illustrating an example of measurement results of powder X-ray diffraction patterns;

FIG. 3 is a set of graphs illustrating examples of measurement results of differential scanning calorimetry, where FIG. 3(a) is a graph illustrating measurement results for $V_{0.98}Cr_{0.02}O_2$, and FIG. 3(b) is a graph illustrating measurement results for $V_{0.9}Cr_{0.1}O_2$; and FIG. 4 is set of graphs illustrating phase transition temperature and transition enthalpy for respective samples ($V_{(1-x)}Cr_xO_2$ with X=0.02, 0.06, 0.1, 0.15, 0.2 and 0.23), where FIG. 4(a) is a graph in which the horizontal axis represents substitution amount, the left vertical axis represents phase transition temperature, and the right vertical axis represents transition enthalpy, and FIG. 4(b) is a graph in which the horizontal axis represents phase transition temperature and the vertical axis represents transition enthalpy.

DESCRIPTION OF EMBODIMENTS

Embodiments of the present invention will be explained next in detail with reference to accompanying drawings.

Firstly, the inventors focused on strongly correlated materials (strongly correlated substances) as substances in which phase transitions give rise to large enthalpy changes i.e. substances that can become a heat storage material.

Strongly correlated electron systems are systems in which at least one degree of freedom of electrons, from among spin, orbital and charge, is actualized due to strong Coulomb repulsion among electrons. Strongly correlated substances include, for instance, transition metal oxides. The actualized spin-orbital-charge degrees of freedom can exhibit large entropy changes accompanying changes in the number of states, derived from order-disorder phase transitions (phase transitions (associated) with the actualized spin-orbital-charge degrees of freedom are referred to as electronic phase transitions). The inventors speculated that a strongly correlated material can constitute a heat storage material, by using the transition enthalpy of the substance, the transition enthalpy being a value calculated by multiplying the amount of entropy change due to the above-described order-disorder phase transition by the temperature at which the order-disorder phase transition occurs.

The above-described phase transitions with the spin-orbital-charge degrees of freedom are phase transitions that occur in a solid-phase, unlike solid-liquid phase transitions having been used hitherto for latent heat storage. Accordingly, there is no concern about leakage of the heat storage material (liquid) out of a container. There is no need for covering the heat storage material using a container or the like. Further, in the phase transitions of the strongly correlated material s such as those described above, there is no concern about phase separation or decomposition during phase transition, unlike solid-liquid phase transitions of inorganic salt hydrates or the like.

The change in volume during phase transition in strongly correlated materials is much smaller than that in solid-liquid phase transitions, and hence such substances are easy to handle when used as heat storage materials.

The conducting state of strongly correlated materials is that of a metal, or of a semiconductor having a comparatively small band gap and referred to as a Mott insulator. Accordingly, such substances exhibit higher thermal conductivity than insulators, which have a large band gap, such as inorganic salt hydrates, organic materials and molten salts that have been used thus far as heat storage materials.

Such being the case, the inventors deemed that problems such as those described in the section on background art might be solved by utilizing a strongly correlated material as a heat storage material. The inventors speculated that a novel heat storage material can be developed by exploiting phase transitions with the orbital degree of freedom, or with multiple degrees of freedom including at least two degrees of freedom from among spin-orbital-charge degrees of freedom.

Given the above considerations, the inventors tackled the development of a heat storage material that can be used at a temperature higher than room temperature. Therefore, the inventors focused firstly on vanadium dioxide ($VO_2$). As is known, $VO_2$ is an oxide, having a rutile structure, that exhibits a metal-insulator transition at 69° C., which is higher than room temperature (see Non-patent literature 1). The above metal-insulator transition is a phase transition with multiple spin and orbital degrees of freedom, and, accordingly, the transition enthalpy is very large, of 237 J/cc. The temperature range at which the above metal-insulator transition occurs is very narrow (first order phase transition).

It is known that the above metal-insulator transition in $VO_2$ becomes separated into two stages, as illustrated in FIG. 1 (Non-patent literature 2), through substitution of part of vanadium (V) by chromium (Cr) (FIG. 1 illustrates a relationship between substitution amount X and phase transition temperature $T_c$ in a case where part of V is substituted by chromium (Cr)). In this two-stage phase transition, the high-temperature phase transition is referred to as "first phase transition" and the low-temperature phase transition is referred to as "second phase transition". It is known that the temperature (phase transition temperature) at which the first phase transition occurs rises with increasing proportion of chromium (Cr) with respect to vanadium (V), whereas the temperature at which the second phase transition occurs drops with increasing proportion of chromium (Cr) with respect to vanadium (V), as illustrated in FIG. 1. Focusing on the first phase transition described above, the inventors endeavored therefore to develop a heat storage material that can be used at a temperature higher than room temperature, by replacing part of V in $VO_2$ with chromium (Cr). As an example, an instance will be explained below where V was replaced with Cr by 2%, 4%, 6%, 8%, 10%, 12.5%, 15%, 17.5%, 20% and 23% in molar ratios.

(Sample Preparation)

An explanation follows next on a method for preparing (synthesizing) a sample ($V_{(1-x)}Cr_xO_2$).

Firstly, $V_2O_5$ powder (purity 99.99%, by Kojundo Chemical Laboratory Co., Ltd.) was heated at 700° C. for 48 hours in a mixed gas of hydrogen and argon (hydrogen 5%, argon 95%) to yield $V_2O_3$ powder as a precursor. The obtained $V_2O_3$ powder was mixed with $V_2O_5$ powder (purity 99.99%, by Kojundo Chemical Laboratory Co., Ltd.) and $Cr_2O_3$ powder (purity 99.9%, by Kojundo Chemical Laboratory Co., Ltd.), to bring the molar ratio of vanadium, chromium and oxygen to predetermined molar ratios. Each mixture (powder) thus obtained was charged into a quartz tube, and was vacuum-sealed (degree of vacuum: about $2 \times 10^{-6}$ torr). Specifically, the quartz tube including the mixture charged thereinto was connected to an evacuation device and the interior of the quartz tube was evacuated. The quartz tube was fully sealed through melting, using a gas burner or the like. Thereafter, the respective mixture was heated at 1000° C. for 48 hours in each quartz tube. As a result of the above process there were synthesized powder samples of $V_{(1-x)}Cr_xO_2$ (X=0.02, 0.04, 0.06, 0.08, 0.1, 0.125, 0.15, 0.175, 0.2 and 0.23).

Also, by each mixture (powder) being compacted at a pressure of about 500 kgf/cm², to form pellets, the pellets being vacuum-sealed in a quartz tube, and an identical thermal treatment being applied, sintered compact samples can be synthesized.

(Sample Identification)

Each synthesized sample was crushed and was set on a reflection free sample holder made of silicon; a powder X-ray diffraction pattern at 22° C. of the sample was then measured using an X-ray diffraction apparatus (RINT, by Rigaku Corporation). FIG. 2 illustrates examples of measurement results (in FIG. 2, the vertical axis denotes diffraction intensity, and the horizontal axis denotes diffraction angle (2θ)). FIG. 2 illustrates measurement results for $V_{(1-x)}Cr_xO_2$ with X=0.02, 0.06, 0.1, 0.15, 0.2 and 0.23, but similar measurement results were obtained for the remaining samples. The measurement results of powder X-ray diffraction patterns revealed that all samples had monoclinic rutile-type crystal structures, at 22° C. No impurity contamination was observed in any of the samples. It was thus found that the target samples are obtained by the above synthesis.

Non-patent literature 2 reported only on samples up to X=0.2, as illustrated in FIG. 1, and stated that samples for X greater than 0.2 cannot be synthesized. As described above, however, the inventors succeeded in synthesizing samples up to X=0.23. A clear difference between a conventional synthesis method and the present synthesis method lies in the procedure for heating the above mixture. Specifically, the mixture is conventionally heated in argon gas, whereas now the mixture was heated upon vacuum sealing (specifically, vacuum sealing under vacuum of about $2 \times 10^{-6}$ torr). It is deemed that this difference underlies the feasibility of obtaining samples ($V_{(1-x)}Cr_xO_2$) up to X=0.23.

The synthesis of a sample ($V_{0.76}Cr_{0.24}O_2$) for X=0.24 was attempted, but the target sample could not be obtained. Accordingly, the solid solution region (substitution amount X) of Cr is found to be 0<X≤0.23.

The degree of vacuum at which the mixture is vacuum-sealed may be higher or lower than $2 \times 10^{-6}$ torr. At least a sample up to X=0.23 can thus be synthesized, as described above, if the mixture is vacuum-sealed, under a vacuum of approximately $2 \times 10^{-6}$ torr, and the mixture is heated.

(Evaluation of Phase Transition Temperature, Transition Enthalpy and Heat Storage Characteristic)

The phase transition temperature and the transition enthalpy that accompanies phase transition were estimated, for each synthesized sample, on the basis of differential scanning calorimetry measurements using a differential scanning calorimeter (DSC204F1/CP Phoenix/μ-Sensor, by NETZSCH). The measurements were carried out with both the temperature raise rate and lowering rate of 10° C./min. FIG. 3 illustrates examples of measurement results. FIG. 3(a) gives measurement results for $V_{0.98}Cr_{0.02}O_2$, and FIG. 3(b) gives measurement results for $V_{0.9}Cr_{0.1}O_2$. In FIG. 3, the vertical axis represents a differential scanning heat quantity and the horizontal axis represents temperature of the sample space. The differential scanning heat quantity denotes "a temperature difference between a reference substance and the sample at the time where a certain heat quantity is given to the reference substance and to the sample" or "a difference between the reference substance and the sample in the heat quantity required in order to bring both the reference substance and the sample to a certain temperature".

As illustrated in FIG. 3, thermal anomalies accompanying the first phase transition were observed in both the temperature raising process and the temperature lowering process, for $V_{0.98}Cr_{0.02}O_2$ and $V_{0.9}Cr_{0.1}O_2$. From the measurement results illustrated in FIG. 3, it was found that the phase transition temperature $T_c$ (phase transition temperature of the first phase transition) for $V_{0.98}Cr_{0.02}O_2$ was 70.6° C. in the temperature raising process, and the phase transition temperature $T_c$ for $V_{0.9}Cr_{0.1}O_2$ was 117° C., in the temperature raising process. The measurement results illustrated in FIG. 3 further revealed that the transition enthalpy ΔH for $V_{0.98}Cr_{0.02}O_2$ was 44.4 J/g, and the transition enthalpy ΔH for $V_{0.9}Cr_{0.1}O_2$ was 38.1 J/g. Thermal anomalies accompanying the first phase transition were likewise obtained for the remaining samples, the phase transition temperature was checked, and the transition enthalpy elucidated.

FIG. 4 illustrates the phase transition temperature and transition enthalpy for each sample ($V_{(1-x)}Cr_xO_2$ with X=0.02, 0.06, 0.1, 0.15, 0.2 and 0.23). The horizontal axis in FIG. 4(a) represents a substitution amount X, the left vertical axis represents phase transition temperature, and the right vertical axis represents transition enthalpy. The horizontal axis in FIG. 4(b) represents phase transition temperature and the vertical axis represents transition enthalpy. The samples and plots in FIG. 4(b) obey a one-to-one correspondence. FIG. 4 illustrates also the phase transition temperature and transition enthalpy of an X=0 sample (i.e. $VO_2$).

A comparison between FIG. 4 (present results) and FIG. 1 (conventional results) reveals that in the samples produced herein, the phase transition temperature rises more sharply than in conventional instances, with increasing substitution amount X. Specifically, it is found that the phase transition temperature is higher than the conventional one for samples for X=0.1 or higher. In the sample for X=0.2, for instance, the present phase transition temperature is about 195° C., which is higher, by 10° C. or more, than the conventional phase transition temperature (about 180° C.). This can be conceivably ascribed to the difference in the synthesis method. Accordingly, it is found that the present synthesis method is suitable for synthesizing $V_{(1-x)}Cr_xO_2$, as a heat storage material, in that the synthesis method allows raising significantly the phase transition temperature with a small substitution amount X. Specifically, the present synthesis method allows raising significantly the phase transition temperature with a small substitution amount X; accordingly, it becomes possible to provide a heat storage material that can be used at a higher temperature than is the case in other synthesis methods. A comparison of the samples for X=0.2 and X=0.23 revealed that the phase transition temperature rises, and suggested that the sample of X=0.23 can be synthesized properly in this case as well (the phase transition temperatures of the samples for X=0.2 and X=0.23 ought to be identical in those cases where a sample for X>0.2 cannot be synthesized).

FIG. 4 reveals that transition enthalpy drops with increasing substitution amount X. However, the lowest value of transition enthalpy in the samples ($V_{(1-x)}Cr_xO_2$ with 0<X≤0.23) is 23.27 J/g=108 J/cc (transition enthalpy for X=0.23), which is comparable to that of the transition enthalpy of substances having been used thus far as heat storage materials (for instance, comparable to the transition enthalpy (306 J/cc) of the solid-liquid phase transition for $H_2O$)). Specifically, the lowest value of transition enthalpy in the samples is 35% or more the enthalpy of solid-liquid phase transition of $H_2O$. Accordingly, it was found that $V_{(1-x)}Cr_xO_2$ (0<X≤0.23) delivers enough functionality for practical use as a heat storage material.

As described above, it becomes possible to provide a novel type of heat storage material that meets the requirements demanded of a heat storage material, by exploiting phase transitions with multiple orbital and spin degrees of freedom of $V_{(1-x)}Cr_xO_2$.

Electronic phases involving spin-orbital-charge degrees of freedom in strongly correlated electron systems are cooperatively generated by electrons that interact strongly with one another. A concern arises therefore of dramatic changes, in their various physical properties, caused by small amounts of impurities. Further, no reports are extant on the transition enthalpy and so forth in the case where part of V is substituted by Cr, and hence drastic reductions in the transition enthalpy, and extreme widening of the temperature range at which phase transitions take place (phase transition broadening), derived from substituting part of V by Cr, were additional concerns. For instance, the metal-insulator transition in $VO_2$ becomes separated into two stages, namely, the first phase transition and the second phase transition through substitution of part of V by Cr, as illustrated in FIG. 1. This gave rise to the concern of considerable decreases in enthalpy of the first phase transition, or phase transition broadening. The experiments carried out above, however, revealed that the transition temperature can be modified freely without incurring considerable decreases in transition enthalpy, or phase transition broadening, for the first phase transition. Accordingly, adjusting the value of X allows modifying the working temperature as appropriate, and selecting easily a substance having a phase transition at the working temperature. Further, heat storage becomes possible at a temperature that could not be maintained in conventional heat storage materials.

The invention claimed is:

1. A heat storage material comprising a substance that induces an electronic phase transition,
    wherein the electronic phase transition is a phase transition with multiple degrees of freedom including a spin degree of freedom and an orbital degree of freedom, which are internal degrees of freedom of electrons,
    the substance is $V_{(1-x)}Cr_xO_2$, where 0.2<X≤0.23.

2. The heat storage material according to claim 1,
    wherein the substance is synthesized by mixing $V_2O_3$ powder, $V_2O_5$ powder and $Cr_2O_3$ powder in such a manner that a molar ratio of vanadium, chromium and oxygen is a predetermined molar ratio, and by heating a mixture obtained through mixing, and
    the substance is synthesized through vacuum sealing and heating of the mixture.

3. The heat storage material according to claim 2,
    wherein the substance is synthesized through vacuum sealing of the mixture under vacuum of $2\times10^{-6}$ torr, and heating of the vacuum-sealed mixture.

4. A method for generating a heat storage material according to claim 1, comprising:
    a mixing step of mixing $V_2O_3$ powder, $V_2O_5$ powder and $Cr_2O_3$ powder in such a manner that a molar ratio of vanadium, chromium and oxygen is a predetermined molar ratio; and
    a synthesis step of vacuum-sealing a mixture obtained through mixing and heating the vacuum-sealed mixture, to thereby synthesize $V_{(1-x)}Cr_xO_2$, where 0.2<X≤0.23.

5. The method for generating a heat storage material according to claim 4,
    wherein, in the synthesis step, the mixture is vacuum-sealed under vacuum of $2\times10^{-6}$ torr, and the vacuum-sealed mixture is heated.

6. The heat storage material according to claim 1,
    wherein the value of the X is selected within the range of 0.2<X≤0.23 in accordance with an intended electronic phase transition.

7. The heat storage material according to claim 6,
    wherein the substance is synthesized by mixing $V_2O_3$ powder, $V_2O_5$ powder and $Cr_2O_3$ powder in such a manner that a molar ratio of vanadium, chromium and oxygen is a predetermined molar ratio, and by heating a mixture obtained through mixing, and
    the substance is synthesized through vacuum sealing and heating of the mixture.

8. The heat storage material according to claim 7,
    wherein the substance is synthesized through vacuum sealing of the mixture under vacuum of $2\times10^{-6}$ torr, and heating of the vacuum-sealed mixture.

* * * * *